H. F. SEYBERT.
REVERSING MEANS FOR SHAFTS.
APPLICATION FILED JUNE 11, 1908.

943,477.

Patented Dec. 14, 1909.

WITNESSES
Edward Thorpe.
C. W. Fairbanks

INVENTOR
Harvey F. Seybert
BY Munn & Co.
ATTORNEYS

UNITED STATES PATENT OFFICE.

HARVEY F. SEYBERT, OF PERRY TOWNSHIP, ARMSTRONG COUNTY, PENNSYLVANIA.

REVERSING MEANS FOR SHAFTS.

943,477.	Specification of Letters Patent.	Patented Dec. 14, 1909.

Application filed June 11, 1908. Serial No. 437,855.

*To all whom it may concern:*

Be it known that I, HARVEY F. SEYBERT, a citizen of the United States, and a resident of Perry township, in the county of Armstrong and State of Pennsylvania, have invented a new and Improved Reversing Means for Shafts, of which the following is a full, clear, and exact description.

This invention relates to certain improvements in reversing mechanism, and more particularly to means whereby the momentum of the engine while slowing down, stores up energy to start the engine in the reverse direction as soon as it comes to a full stop.

Reference is to be had to the accompanying drawings, forming a part of this specification, in which similar characters of reference indicate corresponding parts in both the figures, and in which—

Figure 1:
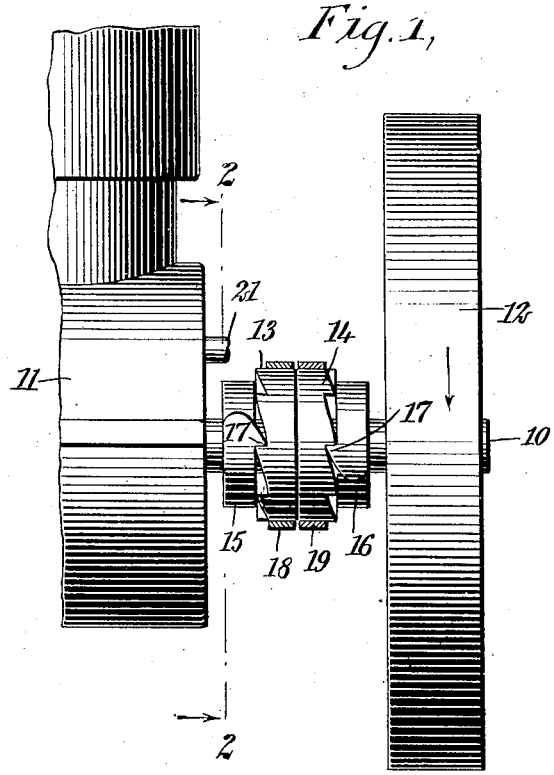
Figure 2:
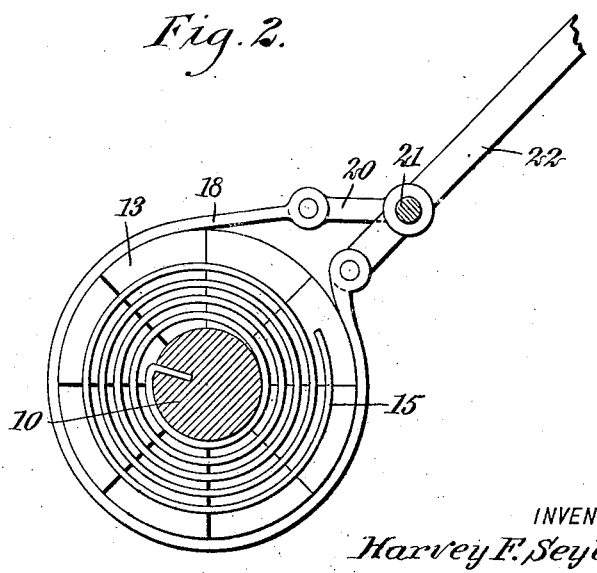

Figure 1 is a side elevation of a portion of an engine having a reversing mechanism constructed in accordance with my invention, and Fig. 2 is a transverse section on the line 2—2 of Fig. 1.

My improved mechanism is adapted for use in connection with any mechanism which it is desired to reverse, but is particularly adaptable for use in connection with the main shaft of an internal combustion engine. In the accompanying drawings, I have shown a portion of an engine in which there is employed a main shaft 10 extending through the crank casing 11 and having a fly wheel 12. On the shaft adjacent the fly wheel, I mount my improved reversing mechanism, which in the specific form illustrated includes two wheels or drums 13 and 14 of substantially the same size and loosely mounted adjacent each other. The wheels each have one face thereof provided with a series of ratchet teeth, the teeth on one of the wheels being oppositely disposed to those on the other wheel. Adjacent the two wheels are two coil springs 15 and 16, each of which has one end thereof rigidly secured to the shaft. The outer or free end of each spring is provided with a tooth, dog, or projection 17, which extends into engagement with the toothed or notched side of the adjacent wheel. Each wheel may freely rotate in one direction by the teeth slipping past the tooth or projection on the corresponding spring, but rotation in the opposite direction causes the spring to be coiled up and the extent of the rotation is limited to the extent to which the spring may be coiled. As the teeth and projections on one are the reverse of those on the other, it is evident that one wheel may freely rotate in one direction while the other wheel may freely rotate in the reverse direction. Adjacent the two wheels are mounted means for engaging therewith to hold them substantially stationary when it is desired to operate the device.

Any suitable form of brake mechanism or gripping mechanism may be employed, but, as shown, I have provided two brake bands 18 and 19, each having one end thereof connected by a link 20 to a stationary pivot 21 and having the opposite end thereof secured to one end of a lever 22 mounted upon said pivot. By depressing the outer end of the lever 22 from the position shown in Fig. 2, the bands may be tightened and both of the wheels held against rotation. Normally the brake is loose, so that both wheels may freely rotate, but when it is desired to stop the engine and start it rotating in the reverse direction, the brake band is tightened and the wheels held stationary. One of the springs will slip past its wheel, while the second spring will become tightly coiled until the engine is prevented from rotating. The instant the engine comes to a full stop, the tension of the spring starts the engine in the reverse direction until the spring is uncoiled. At this time, the brake band is released and the engine permitted to continue rotating in the reverse direction. The direction of rotation may be changed at will, and the operation is substantially the same irrespective of the direction in which the engine may be rotated.

When the engine is rotating in the direction indicated by the arrow on the fly wheel 12, and it is desired to reverse, energy is stored in the coil 15 by the holding of the wheel 13, and this energy is used in starting the engine in the reverse direction again after it is stopped. If it is desired to again reverse, the wheel 14 and the spring 16 will operate for the storing of energy and the later utilizing of the same.

Having thus described my invention, I claim as new and desire to secure by Letters Patent:

1. A reversing means for internal combustion engines, comprising a shaft normally positively rotated by the engine, a spring normally inactive and normally relaxed, connections between one end of the spring and said shaft, a substantially stationary member, connections between the opposite end of the spring and said substantially stationary member, one of said connections being normally out of operation, and means for throwing said last-mentioned connection into operation during the stopping of the engine and shaft, whereby energy will be stored in the spring during the stopping of the shaft and the shaft will be automatically started rotating in the reverse direction by the stored energy of the spring.

2. The combination with a shaft and means for rotating it, of a reversing mechanism comprising a spring coiled about said shaft and normally relaxed, a substantially stationary member, one end of said spring being connected to the shaft and the opposite end of the spring being connected to said substantially stationary member when said spring is in operation, and manually-controlled means for throwing one of said connections into or out of operation during the stopping of the shaft whereby energy will be stored in the spring until the engine stops and the stored energy will be immediately utilized in automatically starting the shaft rotating in the reverse direction.

3. The combination with an internal combustion engine having a shaft positively rotated by the engine, of a coil spring encircling the same and having one end connected to said shaft, and controllable means for engaging with one end of said spring whereby the spring is coiled during the stopping of the engine, said shaft being free to start rotating in the reverse direction immediately after stopping and under the action of the stored energy of the coiled spring.

4. In combination, a shaft, means for rotating it, a coil spring having one end thereof secured to said shaft, and a wheel loosely mounted on said shaft and adapted to engage with said spring to coil the same when said wheel is held against rotation, the coiled spring serving to start the shaft rotating in the reverse direction immediately after the stopping of the shaft.

5. In combination, a shaft, means for rotating it, two wheels loosely mounted thereon and having oppositely-disposed ratchet teeth, two coil springs, each having one end thereof secured to said shaft and having the opposite end thereof in engagement with the teeth of the corresponding wheel, and means for holding said wheels against rotation to coil the springs, stop the shaft from rotating and start it rotating in the reverse direction.

6. In combination, a shaft, means for rotating it, two coil springs, each having one end thereof secured to said shaft, and means for holding the opposite end of one of said springs to stop the shaft and start it rotating in the opposite direction, the particular spring held being dependent upon the direction of said shaft before stopping.

7. The combination with a shaft, of a reversing mechanism comprising an energy-storing device normally inactive and when active exerting its force continuously on the shaft in one direction, and operative connections for engaging with said energy storing device to render the same active and to store energy therein by the rotation of said shaft, said energy-storing device also serving as a brake to stop said shaft during the storing of energy and to act on said shaft to deliver its energy thereto and rotate said shaft in the reverse direction after the stopping of said shaft.

In testimony whereof I have signed my name to this specification in the presence of two subscribing witnesses.

HARVEY F. SEYBERT.

Witnesses:
J. W. VERNER,
C. W. SUTTON.